(12) United States Patent
Gharachorloo et al.

(10) Patent No.: US 7,467,131 B1
(45) Date of Patent: Dec. 16, 2008

(54) METHOD AND SYSTEM FOR QUERY DATA CACHING AND OPTIMIZATION IN A SEARCH ENGINE SYSTEM

(75) Inventors: Kourosh Gharachorloo, Menlo Park, CA (US); Fay Wen Chang, Mountain View, CA (US); Deborah Anne Wallach, Emerald Hills, CA (US)

(73) Assignee: Google Inc., Mountain View, CA (US)

( * ) Notice: Subject to any disclaimer, the term of this patent is extended or adjusted under 35 U.S.C. 154(b) by 533 days.

(21) Appl. No.: 10/676,646

(22) Filed: Sep. 30, 2003

(51) Int. Cl.
G06F 7/00 (2006.01)
G06F 12/00 (2006.01)
G06F 15/16 (2006.01)
G06F 17/00 (2006.01)

(52) U.S. Cl. .............. 707/3; 707/104.1; 707/200; 709/203; 711/113; 715/205

(58) Field of Classification Search .......... 707/1–10, 707/100–102, 104.1, 200–201; 715/501.1, 715/513, 205; 709/201–203, 217–224; 711/113
See application file for complete search history.

(56) References Cited

U.S. PATENT DOCUMENTS

| | | | | |
|---|---|---|---|---|
| 5,222,234 A * | 6/1993 | Wang et al. | ..................... | 707/3 |
| 5,737,734 A * | 4/1998 | Schultz | ..................... | 707/5 |
| 5,974,409 A * | 10/1999 | Sanu et al. | ..................... | 707/3 |
| 6,122,648 A * | 9/2000 | Roderick | ..................... | 715/513 |
| 6,154,813 A * | 11/2000 | Martin et al. | ..................... | 711/133 |
| 6,208,988 B1 * | 3/2001 | Schultz | ..................... | 707/5 |
| 6,226,635 B1 * | 5/2001 | Katariya | ..................... | 707/4 |
| 6,269,423 B1 * | 7/2001 | Kishi | ..................... | 711/113 |
| 6,321,228 B1 * | 11/2001 | Crandall et al. | ..................... | 707/10 |
| 6,415,281 B1 * | 7/2002 | Anderson | ..................... | 707/3 |
| 6,421,675 B1 * | 7/2002 | Ryan et al. | ..................... | 707/100 |
| 6,434,556 B1 * | 8/2002 | Levin et al. | ..................... | 707/5 |
| 6,438,537 B1 * | 8/2002 | Netz et al. | ..................... | 707/3 |
| 6,449,695 B1 * | 9/2002 | Bereznyi et al. | ..................... | 711/134 |
| 6,457,020 B1 * | 9/2002 | Carey et al. | ..................... | 707/103 R |
| 6,460,060 B1 * | 10/2002 | Maddalozzo et al. | ..................... | 715/234 |
| 6,493,721 B1 * | 12/2002 | Getchius et al. | ..................... | 707/104.1 |
| 6,526,479 B2 * | 2/2003 | Rosenzweig | ..................... | 711/133 |
| 6,584,471 B1 * | 6/2003 | Maclin et al. | ..................... | 707/104.1 |
| 6,643,640 B1 * | 11/2003 | Getchius et al. | ..................... | 707/3 |
| 6,658,533 B1 | 12/2003 | Bogin et al. | ..................... | 711/135 |
| 6,701,309 B1 * | 3/2004 | Beeferman et al. | ..................... | 707/3 |
| 6,725,333 B1 * | 4/2004 | Degenaro et al. | ..................... | 711/118 |

(Continued)

OTHER PUBLICATIONS

Sullivan, D., "Inktomi Reenters Battle For Biggest", www.searchenginewatch.com, Jun. 2, 2002.

Primary Examiner—Miranda Le
(74) Attorney, Agent, or Firm—Morgan, Lewis & Bockius LLP (57) ABSTRACT

When searching a document database in response to a search query, a determination is made as to whether a query result corresponding to the search query is stored in a cache. When the query result is stored in the cache, a reuse count for the search query is accessed. When predefined conditions are satisfied, such as the reuse count being larger than a predetermined threshold count, an improved search result is generated in accordance with a first set of predetermined searching criteria, and at least a subset of the improved search result is returned.

21 Claims, 4 Drawing Sheets

U.S. PATENT DOCUMENTS

| | | | |
|---|---|---|---|
| 6,763,362 B2 * | 7/2004 | McKeeth | 707/104.1 |
| 6,826,557 B1 * | 11/2004 | Carter et al. | 707/2 |
| 6,832,218 B1 * | 12/2004 | Emens et al. | 707/3 |
| 6,873,982 B1 * | 3/2005 | Bates et al. | 707/5 |
| 6,879,982 B2 * | 4/2005 | Shirasaka | 707/10 |
| 6,901,410 B2 * | 5/2005 | Marron et al. | 707/104.1 |
| 6,934,699 B1 * | 8/2005 | Haas et al. | 707/2 |
| 6,950,823 B2 * | 9/2005 | Amiri et al. | 707/10 |
| 7,031,958 B2 * | 4/2006 | Santosuosso | 707/3 |
| 7,099,863 B2 * | 8/2006 | Bird et al. | 707/4 |
| 7,127,456 B1 * | 10/2006 | Brown et al. | 707/3 |
| 7,181,444 B2 * | 2/2007 | Porter et al. | 707/3 |
| 2002/0032772 A1 * | 3/2002 | Olstad et al. | 709/224 |
| 2002/0062323 A1 * | 5/2002 | Takatori et al. | 707/514 |
| 2002/0112125 A1 * | 8/2002 | Copeland et al. | 711/125 |
| 2002/0143759 A1 * | 10/2002 | Yu | 707/5 |
| 2002/0184448 A1 * | 12/2002 | Cherkasova et al. | 711/133 |
| 2003/0005233 A1 * | 1/2003 | Stewart et al. | 711/136 |
| 2003/0074537 A1 * | 4/2003 | Pang et al. | 711/202 |
| 2003/0110161 A1 * | 6/2003 | Schneider | 707/3 |
| 2003/0236781 A1 * | 12/2003 | Lei et al. | 707/3 |
| 2004/0044731 A1 * | 3/2004 | Chen et al. | 709/203 |
| 2004/0133564 A1 * | 7/2004 | Gross et al. | 707/3 |
| 2004/0143564 A1 * | 7/2004 | Gross et al. | 707/1 |
| 2004/0143569 A1 * | 7/2004 | Gross et al. | 707/3 |
| 2004/0162943 A1 * | 8/2004 | Degenaro et al. | 711/118 |
| 2004/0205053 A1 * | 10/2004 | Bird et al. | 707/3 |
| 2004/0221235 A1 * | 11/2004 | Marchisio et al. | 715/534 |
| 2005/0044064 A1 * | 2/2005 | Haase | 707/3 |
| 2005/0060290 A1 * | 3/2005 | Herscovici et al. | 707/3 |

* cited by examiner

METHOD AND SYSTEM FOR QUERY DATA CACHING AND OPTIMIZATION IN A SEARCH ENGINE SYSTEM

FIELD OF THE INVENTION

The present invention relates to the field of searching a document database. In particular, the present invention relates to a method and system for providing improved search services based on the frequency of a search query being requested to a search engine.

RELATED APPLICATIONS

This application is related to, and hereby incorporates by reference in their entirety, the following applications: U.S. patent application Ser. No. 10/676,650, "System and Method for Searching an Extended Database," filed Sep. 30, 2003, and U.S. patent application Ser. No. 10/676,651, "System and Method for Efficiently Searching an Extended Database," filed Sep. 30, 2003.

BACKGROUND OF THE INVENTION

In a search engine system, certain commonly searched information are stored in a temporary storage. This temporary storage is usually referred to as the cache of the search engine system. One of the benefits of keeping a local temporary storage of commonly searched information is that it ensures a fast response to subsequent search queries of the same information because it takes less time to retrieve the information from a local memory. Another benefit of caching commonly searched information is to reduce the cost of servicing multiple search queries requesting the same information. When the result of a search query is cached, there is no need to perform another search of the database, which may be distributed over multiple disks and memory arrays in multiple remote computer servers. Retrieving such information from the multiple disks and memory arrays in multiple remote computer servers may require significantly more time and resources than retrieving the information from the cache.

Results of a search query may be stored in a cache in the form of a {key, value} pair. The key is an identifier of the search query, which may be generated by applying a hash function to the search query (or to a normalized version of the search query). The value is typically a result associated with the search query. When the result of a search query is cached, the cached value is used to respond to the query.

SUMMARY

A system for searching a document database includes a cache for storing search results corresponding to previously processed search queries, and a search controller having one or more computer programs containing instructions for determining whether a query result corresponding to a specified search query is stored in the cache. When the controller determines that the query result is stored in the cache, the search controller accesses a reuse count for the search query. When predefined conditions are satisfied, such as the reuse count being larger than a predetermined threshold count, an improved search result is generated in accordance with a set of predetermined searching criteria, and at least a subset of the improved search result is returned.

A method for searching a document database includes receiving a search query and determining whether a query result corresponding to the search query is stored in a cache. When the query result is stored in the cache, a reuse count for the search query is accessed. When predefined conditions are satisfied, such as the reuse count being larger than a predetermined threshold count, an improved search result is generated in accordance with a first set of predetermined searching criteria, and at least a subset of the improved search result is returned.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the following drawings.

DESCRIPTION OF EMBODIMENTS

In search engine systems, there may be different costs associated with each search query. Various factors contribute to the differences in cost, such as the number of databases searched, the various combinations of keywords used in a search, the length of time spent on a search and so on. Tradeoffs need to be made to provide a search result within a reasonable time frame (e.g., within a half second) and within a reasonable cost target. A standard search result may be obtained by searching a database with a set of standard search criteria. Meanwhile an improved search result may be obtained by searching one or more databases with a more extensive set of search criteria. Typically, the improved search result may require more time and/or more resources to generate than a standard search result.

As mentioned above, the average response time of a search engine can be improved by storing the search results of previously requested search queries in the cache of the search engine system. Also, the average resources expended to respond to a search query may be significantly reduced through the use of a cache. In addition, as taught herein, the search results information stored in a cache can also be used in other ways to improve the performance or the quality of the results produced by a search engine. In particular, the cache may store in association with each cached search result a reuse count, indicating the number of times the cache search result has been reused. In some embodiments, the cache may further store a quality indication for each cached search result, indicating a quality of the cached search result. For instance, the quality indication may indicate whether the cached search result is a standard search result or an improved search result (obtained through the use of additional search resources, such as by searching using a more extensive set of search criteria).

As will be explained below, reuse information and/or quality information for cached search results can be used to reduce the cost of providing additional services, such as providing an improved search result to a particular search query.

Figure 1:
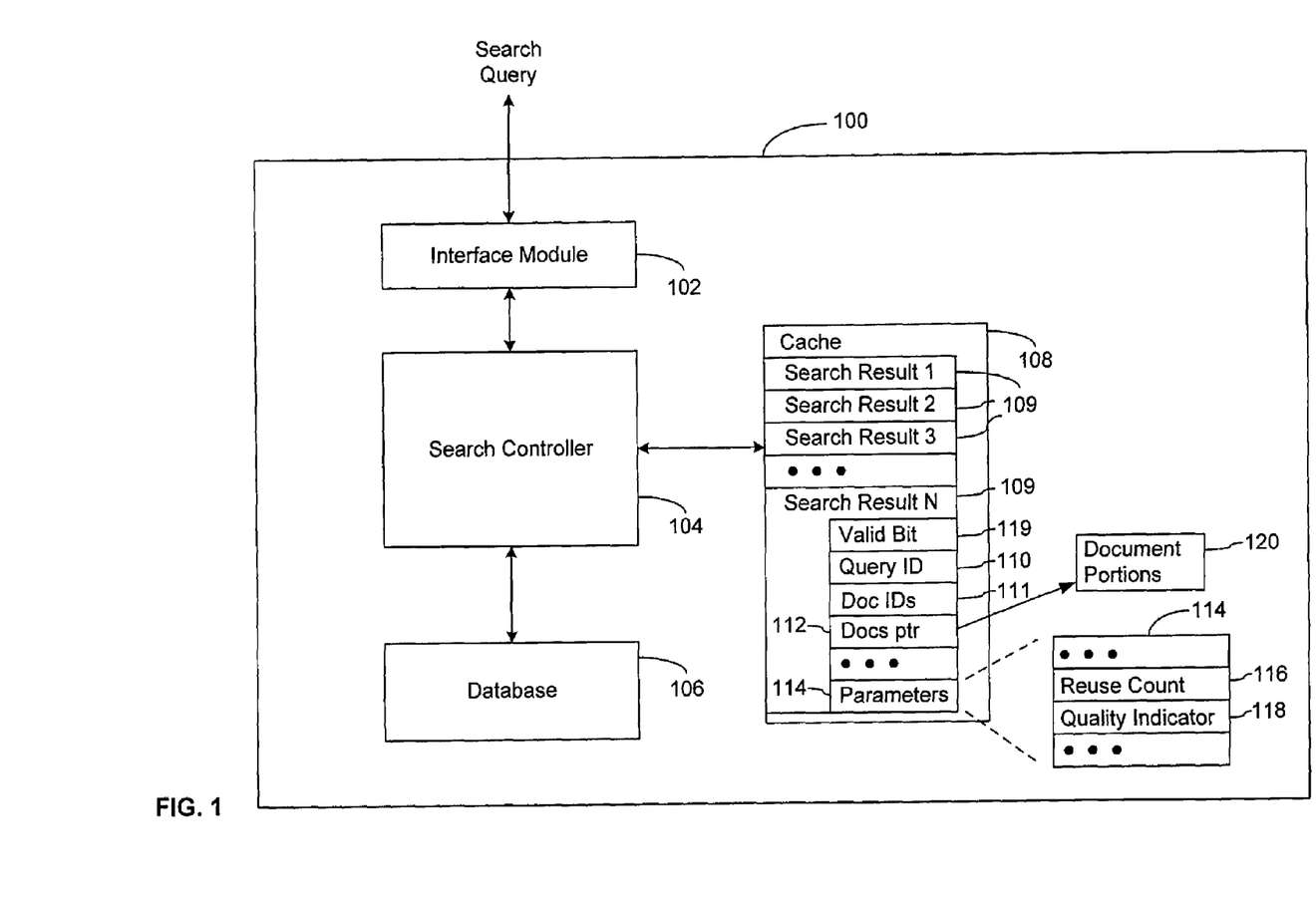
FIG. 1 illustrates an embodiment of a search engine system.

FIG. 1 illustrates an embodiment of a search engine system. The search engine system 100 includes an interface module 102, a search controller 104, a database 106, and a cache 108. The interface module 102 receives search query requests and sends search results in response to the search query requests. The search controller 104 controls the searching process, including searching the databases, analyzing and formatting the search results. The database 106 stores documents and their corresponding document identifiers. The cache 108 provides a temporary storage of search results 109. Since this temporary storage space is usually limited, various schemes may be used to determine which search query requests are retained in the cache 108. For instance, in some embodiments the cached search result retention policy is to evict the oldest cached search result when room is needed to store a new search result in the cache 108. In other embodiments the cached search result retention policy is to evict the oldest cached search result having a "low" reuse count, where "low" is defined to mean a reuse count below either a predefined threshold or a dynamically determined threshold.

Each valid search result 109 stored in the cache contains at least a search query identifier 110, document identifiers 111, and parameters 114 of the corresponding search result. The parameters 114 further contain at least a reuse count 116 and a quality indicator 118 of the corresponding search result. In some embodiments, the parameters 114 include the reuse count 116, but do not include the quality indicator 118. In some embodiments, each cache entry (i.e., for representing a respective cached search result) in the cache includes a valid bit 119 to indicate whether the entry contains valid data. When the valid bit 119 for a cache entry 109 indicates that the entry 109 is invalid (e.g., the bit is cleared), the cache entry 109 does not store a useable search result.

Some cache result entries 109 also include portions of documents 120, such as the snippets of a subset of the documents identified by the document identifiers 111. The portions of documents 120 are the portions to be displayed to a query requester, to help the user to determine whether to select the document for viewing. In some embodiments, the document portions 120 are stored in a location (e.g., a memory or disk location) identified by a pointer 112 in the cached search result entry 109. The document portions 120 may be organized as a list, and may contain document portions for only a small portion of the documents identified by the document identifiers 111. For example, the document portions 120 may comprise document portions for one or more "pages of results", where each page of results includes document portions for N (e.g., 15, or more generally 10 to 50) documents. However, some cached search results need not include document portions 112. In some embodiments document portions 120 are not stored in the cache. Instead, the document portions are generated in response to each search query and are not stored in the cache. In some embodiments, the document portions 120 are stored in a separate cache data structure from the index results.

Note that the search engine system shown in FIG. 1 can be used as an Internet search engine, for locating documents on the World Wide Web, or as an Intranet search engine, for locating documents stored on servers or other hosts within an Intranet. In addition, the methodology described herein is applicable to implementations where only portions of documents, such as titles and abstracts, are stored in the database of the search engine system.

Figure 2:
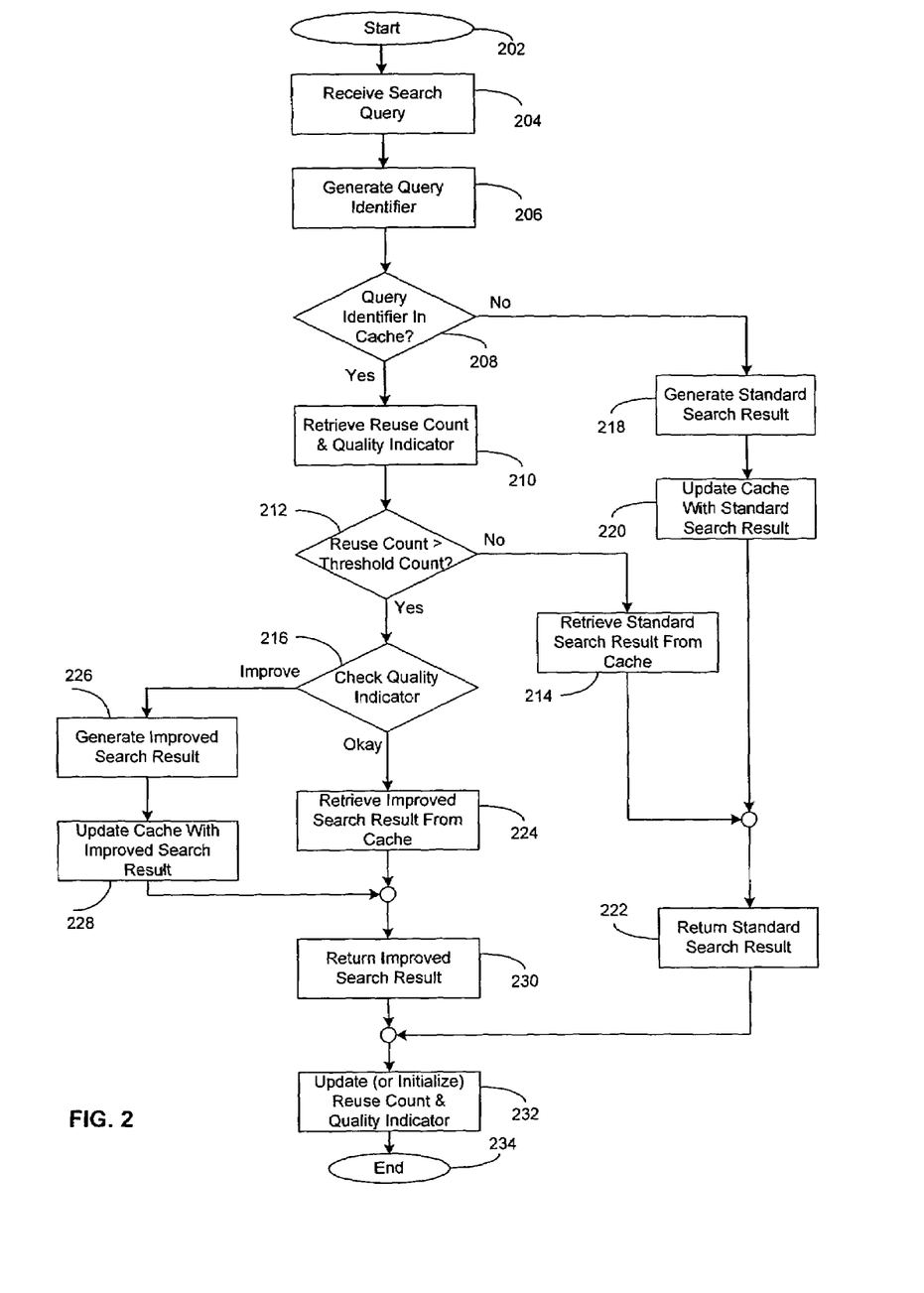
FIG. 2 illustrates a method for searching a document database using the search engine system of FIG. 1.

FIG. 2 illustrates a method for searching a document database using the search engine system of FIG. 1. The method starts at step 202, thereafter it moves to step 204 where the interface module 102 receives a search query. At step 206, the search controller 104 applies a hash function to the received search query to generate a search query identifier. In some embodiments, the search query is normalized prior to applying the hash function so that functionally identical search queries are hashed to the same search query identifier value. Normalization may include logically ordering terms in the search query in accordance with a predefined set of ordering rules, and may also include removing or changing punctuation and/or other characters in the search query in accordance with a set of normalization rules.

At step 208, a first determination is made as to whether the search query identifier already exists in the cache 108 (i.e., whether the cache already stores search results for the received search query). If the search query identifier does not already exist in the cache (208-No), the method continues at step 218 where the search controller generates a search result for the search query. In the alternative, if the search query identifier already exists in the cache (208-Yes), the method continues at step 210 where the search controller 104 retrieves a reuse count 116 and a quality indicator 118 corresponding to the search query identifier. At step 218, the search controller generates a standard search result in accordance with a standard set of search criteria. At step 220, the search controller updates the cache with the standard search result generated in step 218. At step 222, the search controller returns at least a subset of the standard search result to the requester, and thereafter moves to step 232.

With respect to step 222 (and step 230 as well), the search result may include hundreds or even thousands of documents, but the information initially returned to the requester typically includes a listing of only a small subset of those. In some embodiments, when the search result includes more documents than can be conveniently listed on a single page (e.g., more than 10, 15 or 25, depending on the implementation), the initial search result listing provided to the requester lists between 10 and 25, inclusive, documents that satisfy the query. In some embodiments, the initial search result listing contains documents that have been evaluated to be the ones most likely to be of interest to the requester. For instance, the returned listing may be ordered in accordance with query based rankings assigned to the documents in the search result. The requester may subsequently request the search engine system to return listings of additional documents from the search results.

At step 212, a second determination is made as to whether the reuse count 116 is larger than a predetermined threshold count for the search query identifier. If the reuse count is not larger than the threshold count (212-No), the method moves to step 214 where the search controller retrieves a standard search result from the cache. Else if the reuse count is larger than the threshold count (212-Yes), the method moves to step 216 where a third determination is made as to whether the quality indicator 118 meets predefined criteria for generating an improved search result. The quality indicator 118 may include one or more values, and may specify one or more attributes of the cached search result. For instance, in some embodiments the quality indicator 118 specifies whether the cache search result is an improved search result or a standard search result. In some embodiments, the quality indicator 118 includes a value that specifies whether the cached search result lists more than a predefined number of documents. In yet other embodiments, the quality indicator 118 includes a metric generated by applying a quality indication function to the cached search result.

At step 216, if the quality indicator 118 meets the predefined criteria for generating an improved search result (e.g., the quality indicator has a first predefined value indicating that the cached search result is a standard search result, and/or that the cached search result lists fewer than N documents), the method moves to step 226 where the search controller generates an improved search result in accordance with a more extensive set of search criteria than the standard set of search criteria used in step 218. In some embodiments, the "more extensive set of search criteria" is implemented as a search that includes both a primary database, used to produce standard search results, and an extended database, which includes additional documents. In some embodiments the primary database includes at least 3 billion documents, and the extended database includes at least 2 billion additional documents. In some embodiments, either the primary database or the extended database, or both, will contain significantly more documents than this.

In one embodiment, the documents in the primary database have, on average, higher page rank than the documents in the extended database. Page rank is a query independent rank assigned to documents, indicating the likely importance of the document without regard to any specific query. In some embodiments, the "more extensive set of search criteria" used to generated improved search results is implemented by automatically adjusting, supplementing or modifying the search query in ways that are predicted to improve the quality of the search results. For example, in some embodiments a lexical analysis of the search query is performed, which may reveal that a term in the search query is potentially restrictive in ways not intended by the query requester, in which case the term is replaced with a replacement term or group of terms so as to produce a modified search query that is likely to produce a larger set of search results, which may include additional documents deemed relevant by the query requester. Similarly, in some embodiments, the search controller may determine that a search query is potentially broader in scope than was intended by the query requester, and may generate a modified search query of narrower scope, thereby enabling the search engine to identify documents more likely to be relevant to the query requester.

In other embodiments, the "more extensive set of search criteria" is implemented by changing the mechanisms used to search a database of documents, for example by increasing the search depth to a larger search depth than the standard search depth, or by changing the way intermediate search results are pruned, so as to provide more result candidates to a query scoring function, thereby including in the improved search results documents that might ordinarily be excluded from the search results.

At step 228, the search controller updates the cache with the improved search result generated in step 226, and then returns a listing of at least a subset of the documents in the search result to the person or device that submitted the search query (230).

On the other hand, if at step 216 the quality indicator 118 does not satisfy the predefined criteria for generating an improved search result (e.g., the quality indicator 118 has a second predefined value indicating that an improved search result is already stored in the cache, or that the standard search result in the cache has sufficiently high quality), an improved search result is not generated. Instead, the search controller retrieves the search result from the cache (224) and returns at least a subset of that search result to the person or device that submitted the search query (230).

At step 232, the search controller updates the corresponding reuse count 116 and quality indicator 118 of the search query identifier in the cache. If the cached search result is a standard search result that was first generated in response to the current search query, the reuse count 116 and quality indicator 118 are initialized rather than being updated. The reuse count is set to an initial value, such as 0 or 1, and the quality indicator 118 is set to a value consistent with the standard search result stored in the cache. The method ends at step 234.

In some embodiments, a quality indicator 118 is not used. Instead, if the reuse count 116 is equal to a predefined threshold value, the search controller generates the improved search result. If the reuse count is equal to any other value, then the search controller simply returns the cached search result, regardless of whether that is the standard search result or an improved search result.

Note that the steps 220 and 228 of updating the cache, the steps 222 and 230 of returning search results, and the step 232 of updating (or initializing) the reuse count may not need to be performed in the order described. These steps may be conducted in parallel or in a different order. For example, the step 232 of updating reuse count and quality indicator may occur in parallel or prior to the steps 220 and 228 of updating cache with (improved or standard) search results, and may occur in parallel or prior to the steps 222 and 230 of returning (improved or standard) search results to the requester.

Figure 3:
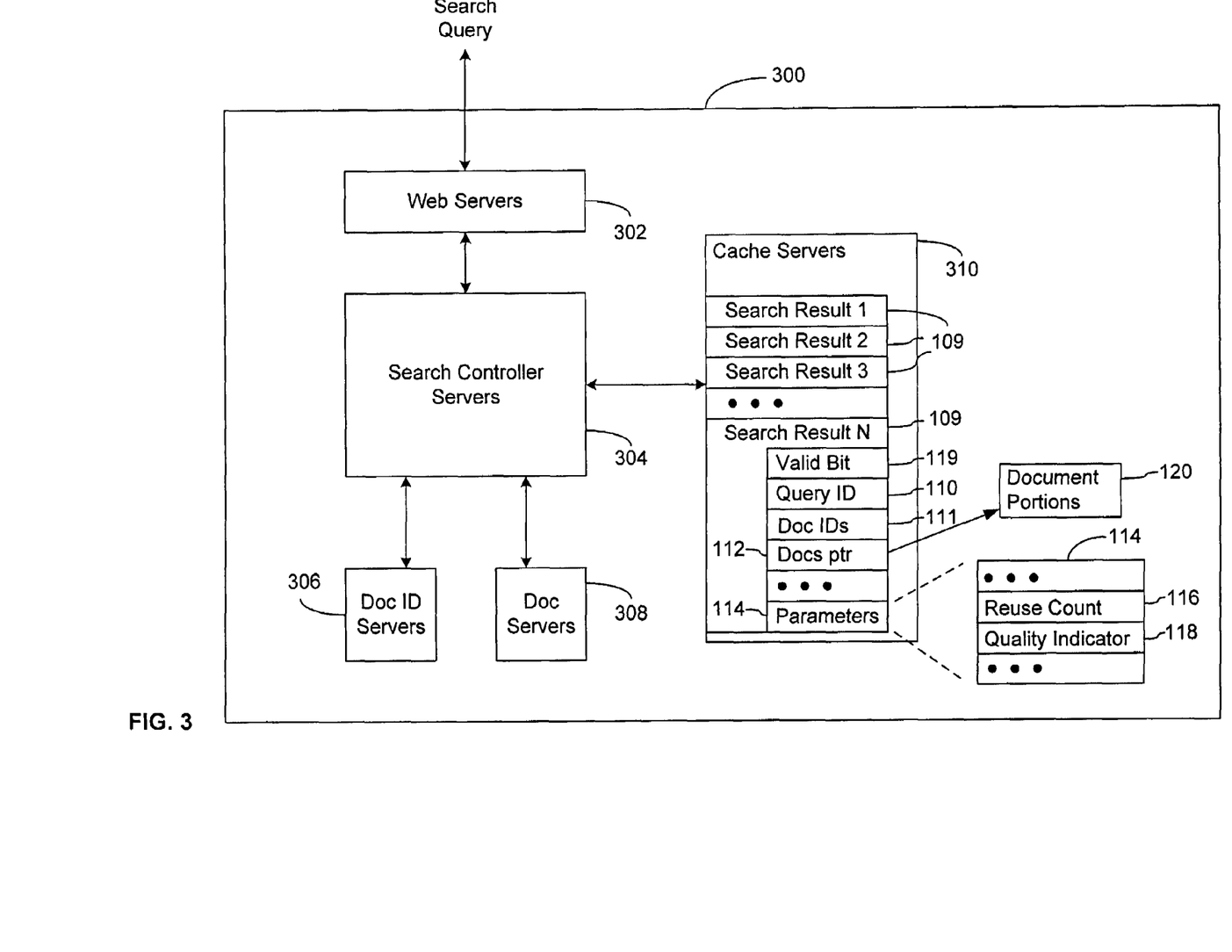
FIG. 3 illustrates an alternative embodiment of the search engine system of FIG. 1.

FIG. 3 illustrates an alternative embodiment of the search engine system of FIG. 1. In the alternative search engine system 300, one or more web servers may be used to implement the function of the interface module 102. The function of the search controller 104 may be implemented with one or more search controller servers. In addition, the database 106 may be implemented with one or more document identifier servers 306 for storing the identification information of documents (e.g., indexes for mapping words (and in some embodiments for mapping phrases as well) to documents containing those words) and one or more document servers 308 for storing the actual documents of the database. Furthermore, the cache 108 may be implemented with one or more cache servers 310 for providing temporary storages of search results. The one or more web servers 302, search controller servers 304, document identifier servers 306, document servers 308, and cache servers 310 may be distributed over multiple computer networks and over multiple geographical regions.

Figure 4:
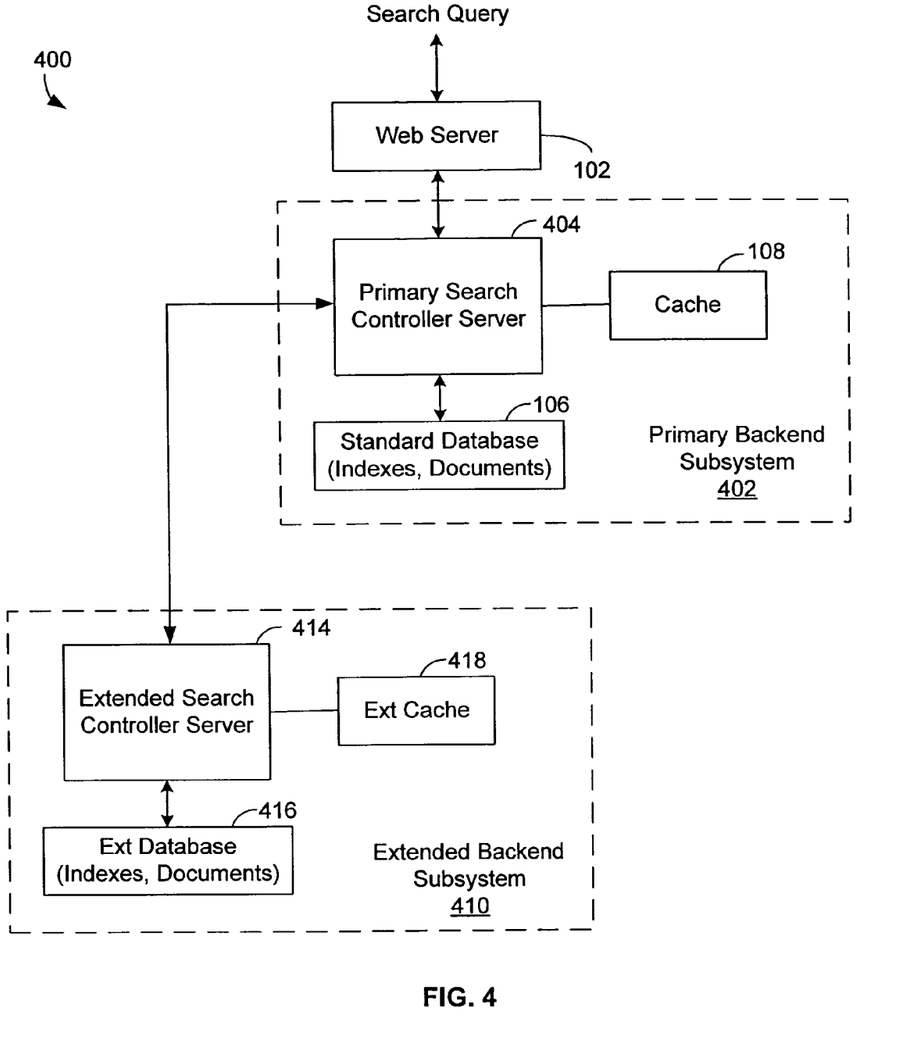
FIG. 4 illustrates an embodiment of the search engine system of FIG. 1 having a primary search engine and an extended search engine.

FIG. 4 illustrates another embodiment of the search system of FIG. 1. In this search engine system 400, there is a primary backend subsystem 402, and an extended backend subsystem 410. The primary backend subsystem 402 includes a primary search controller server 404, a cache for storing query search results, and a standard database 106 of documents to be searched when generating a standard search result. The components of the primary backend subsystem 402 have been described above, with one exception. In particular, the primary search controller server 404 is configured to convey a search query to the extended backend subsystem 410 when it determines that an improved search result is to be generated (e.g., at steps 216, 226 of the method shown in FIG. 2). The extended backend subsystem 410 is similar in structure and operation to the primary backend subsystem 402, except it searches an different database, herein called the extended database 416, instead of the standard database 106. The extended search controller server 414 and extended cache 418 are configured and operate similarly to the search controller server 104 and cache 108 as described above with reference to FIG. 1. Thus, the extended search controller server 414, upon receiving a search query, first checks its cache 418 to determine if the cache 418 contains search results for the search query. If so, it returns the cached search results to the primary search controller server 404. Otherwise, it searches the extended database 416 to produce a set of extended search results, which it stores in the extended cache 418 and returns to the primary search controller server 404. The primary search controller server 404 combines the extended search results, if any, from the extended search controller server 410 with the standard search results, if any, to generate the improved search results. For instance, the documents listed in the standard and extended search results may be ranked in accordance with a query ranking function (e.g., a function that ranks documents in the query result in accordance with their likely relevance to the query and/or that ranks documents in accordance with their likely relevance to a user submitting the query), and the combined results may then be listed in an order corresponding to the query rank values. In some embodiments, if the number of documents exceeds a predefined value V (e.g., 1000), the combined results may be pruned so as to exclude documents have a query rank less than the query rank of the Vth document in the rank ordered list of documents in the combined results. In other embodiments, other functions or methods may be used to prune the set of combined results so as to exclude documents deemed unlikely to be of interest to the person or device that submitted the search query.

The costs of generating improved search results for search queries can be measured, as can be the percentage of search queries that would benefit from the improved search result when any particular cache reuse threshold requirement (or other predefined criteria for generating an improved search result) is used to determine when a cached search result should be recomputed or improved. For example, one can measure the overall system costs in terms of impact on system performance, the number of servers needed to maintain a particular level of service, and the number or percentage of queries that would receive the improved search results. These measurements can be made for multiple potential policies, such as generating an improved search result when the cache reuse value for a search query equals N, for values of N ranging from, say, 3 to 20.

For example, given a threshold use count of 11, a search query that occurs 20 times benefits from the improved search result only the last 10 times that the search query is processed. The percentage of total search queries that will be serviced by improved search results when the threshold use count is five will clearly be much higher than when the threshold use count is 10. By assigning an average value (i.e., an increase in value over the normal search results) to the improved search results, a system designer or administrator can select a threshold use count value where the benefit (i.e., the increase in value multiplied by the number of improved search results) equals or exceeds the cost of generating the improved search results. Hence, tradeoffs may be made to achieve cost amortizations for obtaining improved search results while providing a reasonable query coverage.

In another embodiment, time stamped copies of the reuse count values for the caches search results may be stored in the cache and may be used to identify the frequency of certain search queries. The frequency of use of the cached search results may indicate recent hot queries. In other words, the frequency of a search query may be determined by using the time stamped copies of the reuse count. Based on the frequency of certain search queries, the search controller may trigger various operations and services for those search queries that turn hot.

In yet another embodiment, the reuse count may also be used for garbage collection. That is, when it is time to remove certain search results from the cache, the search controller may use the reuse count to determine the frequency of reuse for all the cached search results. It may then decide, based on the frequency of reuse, to keep certain search results with high reuse count and to delete certain search results with low reuse count.

One skilled in the relevant art will recognize that there are many possible modifications of the disclosed embodiments that could be used, while still employing the same basic underlying mechanisms and methodologies. For example, the disclosed method of searching a document database may be implemented in the Internet or an Intranet environment. Various functions of the search engine system may be implemented with one or more computer servers distributed over multiple computer networks and over multiple geographical regions. Parameters other than the reuse count and the quality indicator may be stored in the cache and may be used for providing additional services by the search engine.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for searching a document database, comprising:
   receiving a search query;
   returning a search result corresponding to the search query, including:
      determining whether a cached query result corresponding to the search query is stored in a cache;
      when the determining returns a negative result, generating a first search result in accordance with a first set of predetermined search criteria and returning as the search result at least a subset of the first search result;
      when the determining returns a positive result:
         accessing a reuse count of the cached search result, and determining a quality of the cached search result; wherein the cached search result comprises a list of results that satisfy the search query, and the reuse count comprises a number of times that the list of results has been reused to respond to submissions of the search query;
         when the reuse count is less than or equal to a predetermined threshold count or a quality indication of the cached search result does not meet predefined criteria, returning as the search result at least a subset of the cached search result;
         when the reuse count is larger than the predetermined threshold count, and the quality indication meets the predefined criteria, generating an improved search result in accordance with a second set of predetermined search criteria using additional search resources, wherein the improved search result comprises an improved list of results that satisfy the search query, returning as the search result at least a subset of the improved search result, updating the cache with the improved search result, and updating the reuse count of the cached search result; and
         when the reuse count is larger than the predetermined threshold count and the quality indication does not meet the predefined criteria and indicates that the cached search result is the improved search result corresponding to the search query, retrieving the improved search result from the cache, and returning as the search result at least a subset of the improved search result.

2. The method of claim 1, wherein:
when the quality indication has a first value, the cached search result is generated by searching only the document database; and
wherein the second set of search criteria comprises searching both the document database and an additional database.

3. The method of claim 1, wherein:
when the quality indication has a first value, the cached search result is generated by searching the document database using a standard search depth; and
the second set of predetermined search criteria comprises searching the document database with a larger search depth than the standard search depth.

4. The method of claim 1,
wherein the first set of search criteria comprises searching the document database using initial search criteria; and
wherein the second set of predetermined search criteria comprises searching the document database using modified search criteria distinct from the initial search criteria.

5. The method of claim 1, wherein generating an improved search result comprises:
submitting the search query to one or more document identification and document servers in accordance with the second set of predetermined search criteria;
receiving search results from the one or more document identification and document servers; and
creating a search result list from the received search results.

6. The method of claim 1 further comprising:
when the cache is determined not to have stored therein the search result corresponding to the search query:
generating a standard search result in accordance with the first set of predetermined search criteria;
storing the standard search result in the cache;
setting the reuse count of the cached search result to an initial value; and
returning at least a subset of the standard search result.

7. The method of claim 6, wherein generating the standard search result comprises:
submitting the search query to one or more document identification and document servers in accordance with the first set of predetermined search criteria;
receiving search results from the one or more document identification and document servers; and
creating a search result list from the received search results.

8. The method of claim 1, wherein generating the improved search result includes searching both the document database and an additional database.

9. The method of claim 1, wherein generating the improved search result includes searching the document database to a larger search depth than a search depth used in generating the first search result.

10. The method of claim 1, wherein generating the improved search result includes searching using modified search criteria distinct from the initial search criteria.

11. A method for searching a document database, comprising:
receiving a search query;
returning a search result corresponding to the search query, including:
determining whether a cached query result corresponding to the search query is stored in a cache;
when the determining returns a negative result, generating a first search result in accordance with a first set of predetermined search criteria and returning as the search result at least a subset of the first search result;
when the determining returns a positive result:
accessing a reuse count of the cached search result, and determining a quality of the cached search result; wherein the cached search result comprises a list of results that satisfy the search query, and the reuse count comprises a number of times that the list of results has been reused to respond to submissions of the search query;
when the reuse count is less than or equal to a predetermined threshold count or a quality indication of the cached search result does not meet predefined criteria, returning as the search result at least a subset of the cached search result; and
when the reuse count is larger than the predetermined threshold count, and the quality indication meets the predefined criteria, generating an improved search result in accordance with a second set of predetermined search criteria using additional search resources, wherein the improved search result comprises an improved list of results that satisfy the search query, and returning as the search result at least a subset of the improved search result, updating the cache with the improved search result, and updating the reuse count of the cached search result;
when the cache is determined not to have stored therein the search result corresponding to the search query:
generating a standard search result in accordance with the first set of predetermined search criteria;
storing the standard search result in the cache;
setting the reuse count of the cached search result to an initial value; and
returning at least a subset of the standard search result; and
when the determining returns a positive result and the reuse count is less than or equal to the predetermined threshold count:
retrieving the standard search result from the cache; and
returning at least a subset of the standard search result.

12. A system for searching a document database, comprising:
a cache for storing search results corresponding to previously processed search queries;
a search controller including one or more computer programs containing instructions for:
determining whether a cached search result corresponding to a specified search query is stored in the cache;
returning a search result corresponding to the search query, including:
when the determining returns a negative result, generating a first search result corresponding to the search query in accordance with a first set of predetermined search criteria and returning as the search result at least a subset of the first search result;
when the determining returns a positive result:
accessing a reuse count of the cached search result and determining a quality of the cached search result; wherein the cached search result comprises a list of results that satisfy the search query, and the reuse count comprises a number of times that the list of results has been reused to respond to submissions of the search query;

when the reuse count is less than or equal to a predetermined threshold count or a quality indication of the cached search result does not meet predefined criteria, returning as the search result at least a subset of the cached search result; and when the reuse count is larger than the predetermined threshold count and the quality indication meets the predefined criteria, generating an improved search result in accordance with a second set of predetermined search criteria using additional search resources, wherein the improved search result comprises an improved list of results that satisfy the search query, returning at least a subset of the improved search result as the search result, updating the cache with the improved search result, and updating the reuse count of the cached search result; and when the reuse count is larger than the predetermined threshold count and the quality indication does not meet the predefined criteria and indicates that the query result stored in the cache is the improved search result corresponding to the search query, retrieving the improved search result from the cache, and returning as the search result at least a subset of the improved search result.

13. The system of claim 12, wherein the search results in the cache comprise:
   identifications of documents;
   contents of portions of documents corresponding to at least a subset of the identifications of documents; and
   parameters of documents corresponding to the identifications of documents.

14. The system of claim 12, wherein:
   when the quality indication has a first value, the cached search result is generated by searching only the document database; and
   the second set of predetermined search criteria comprises searching both the document database and an additional database.

15. The system of claim 12, wherein:
   when the quality indication has a first value, the cached search result is generated by searching the document database using a standard search depth; and
   the second set of predetermined search criteria comprises searching the document database with a larger search depth than the standard search depth.

16. The system of claim 12,
   wherein the first set of search criteria comprises searching the document database using initial search criteria; and
   wherein the second set of predetermined search criteria comprises searching the document database using modified search criteria distinct from the initial search criteria.

17. The system of claim 12, wherein generating an improved search result comprises instructions for:
   submitting the search query to one or more document identification and document servers in accordance with the second set of predetermined search criteria;
   receiving search results from the one or more document identification and document servers; and
   creating a search result list from the received search results.

18. The system of claim 12, the computer programs of the search controller further comprising instructions for:
   when the cache is determined not to have stored therein search results corresponding to the search query:
      generating a standard search result in accordance with the first set of predetermined search criteria;
      storing the standard search result in the cache;
      setting the reuse count of the cached search result to an initial value; and
      returning at least a subset of the standard search result.

19. The system of claim 12, wherein the instructions for generating the standard search result comprise instructions for:
   submitting the search query to one or more document identification and document servers in accordance with the first set of predetermined searching criteria;
   receiving search results from the one or more document identification and document servers; and
   creating a search result list from the received search results.

20. The system of claim 12, including:
   one or more interface modules for receiving a search query;
   one or more storage modules for storing document identifications and the corresponding documents to be searched;
   wherein the search controller is configured to generate the improved search result by searching at least a subset of the stored document identifications.

21. A system for searching a document database, comprising:
   a cache for storing search results corresponding to previously processed search queries;
   a search controller including one or more computer programs containing instructions for:
      determining whether a cached search result corresponding to a specified search query is stored in the cache;
      returning a search result corresponding to the search query, including:
         when the determining returns a negative result, generating a first search result corresponding to the search query in accordance with a first set of predetermined search criteria and returning as the search result at least a subset of the first search result;
         when the determining returns a positive result:
            accessing a reuse count of the cached search result and determining a quality of the cached search result; wherein the cached search result comprises a list of results that satisfy the search query, and the reuse count comprises a number of times that the list of results has been reused to respond to submissions of the search query;
            when the reuse count is less than or equal to a predetermined threshold count or a quality indication of the cached search result does not meet predefined criteria, returning as the search result at least a subset of the cached search result; and
            when the reuse count is larger than the predetermined threshold count and the quality indication meets the predefined criteria, generating an improved search result in accordance with a second set of predetermined search criteria using additional search resources, wherein the improved search result comprises an improved list of results that satisfy the search query, returning at least a subset of the improved search result as the search result, updating the cache with the improved search result, and updating the reuse count of the cached search result; and when the cache is determined not to have stored therein search results corresponding to the search query:

generating a standard search result in accordance with the first set of predetermined search criteria;

storing the standard search result in the cache;

setting the reuse count of the cached search result to an initial value; and returning at least a subset of the standard search result; and when the determining returns a positive result and the reuse count is less than or equal to the predetermined threshold count, retrieving the standard search result from the cache, and returning at least a subset of the standard search result.

* * * * *